Feb. 11, 1969  O. SAHM  3,426,395
ROPE CLAMP
Filed Dec. 7, 1966
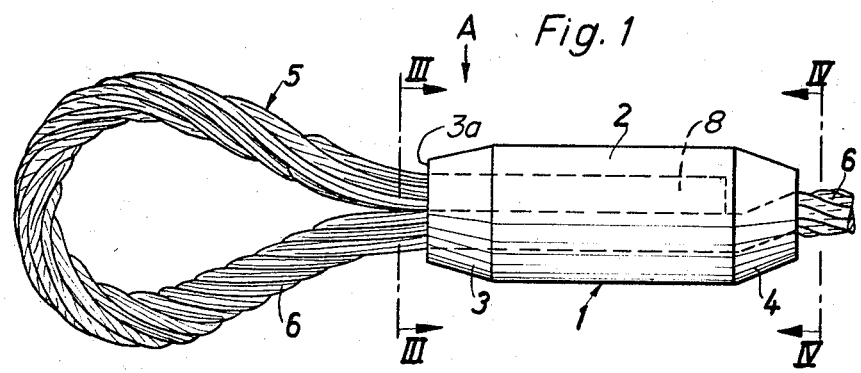
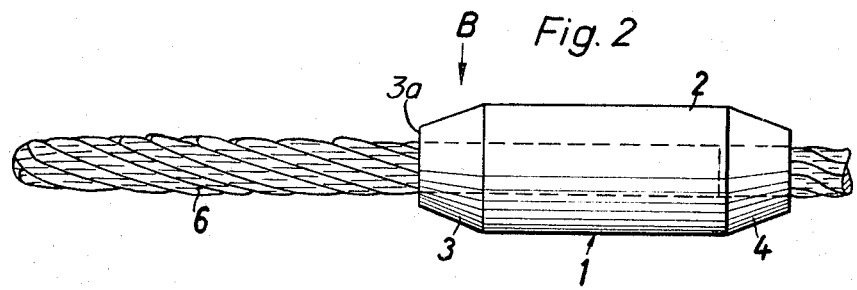
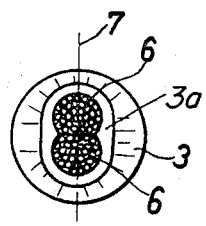
Fig. 3
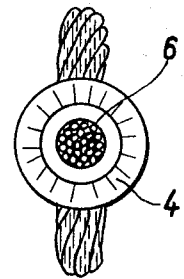
Fig. 4
Inventor:
Otto Sahm
by Singer, Stern & Carlberg
Attorneys

United States Patent Office 3,426,395
Patented Feb. 11, 1969

3,426,395
ROPE CLAMP
Otto Sahm, 8 Behringstrasse, Bremerhaven, Germany
Filed Dec. 7, 1966, Ser. No. 599,829
Claims priority, application Germany, July 9, 1966,
S 104,721
U.S. Cl. 24—123      2 Claims
Int. Cl. F16b 7/04

ABSTRACT OF THE DISCLOSURE

A rope clamp which secures two overlapping rope portions together and which comprises a sleeve having a cylindrical center portion and one end portion through which two overlapping rope portions extend, whereby this one end portion of the sleeve tapers conically outwardly and is oval in cross-section. The other end of the cylindrical center portion of the sleeve is pressed around a single rope portion and tapers conically outwardly but is circular in cross-section.

---

The invention relates to a sleeve-like rope clamp which consists of plastically deformable material, is pressed onto two adjacent pieces of rope in order to connect them, and has a cylindrical main portion and at least one adjacent, continuously tapering end portion surrounding both pieces of rope.

The tapered end portion is intended to avoid difficulties in use and damage to the clamp, which might occur when the end of the clamp hooks behind a projection or step during movement of the rope. The gradual transition from the external cross-section of the rope to the external cross-section of the main portion of the clamp removes or at least reduces these risks.

In known rope clamps the tapered end portion is conical or frusto-conical. This has led to difficulties when the end portion surrounds two adjacent pieces of rope and is pressed with the main portion of the clamp from a length of flat tubing with a uniform cross-section, since the pieces of rope are subject to excessive compression during pressing to form the cone and their supporting capacity is reduced.

It has therefore been proposed that when rope eyes are made with such a clamp the free end of the rope, which represents the second piece of rope in the sleeve, should not extend as far as the end portion of the clamp, i.e. that only one piece of rope should be present in the area of the conical pressing. However, this measure is impossible at the other end of the clamp—the end facing the eye—so that the rope clamp with two conical end portions, though proposed more than once, has not been practicable.

By means of the invention, however, a tapered end portion surrounding two adjacent pieces of rope can be made without excessive strain on the rope. To this end, according to the invention, the end portion tapers from the circular cross-section of the main portion into a substantially oval shape at the exit for the pieces of rope, the main axis of the oval running in the direction of the line connecting the rope centres. The two pieces of rope are stressed no more at the exit from the clamp than in the main portion of the clamp. On the contrary, by suitably selecting the proportions the pieces of rope can be compressed less in the end portion than in the main portion, to give a more gradual transfer of stress and so reduce the risk that the spreading forces occurring at the eye will break open the clamp.

In the drawings, which show a preferred embodiment of the invention:

FIG. 1 is a plan view of a rope eye with a clamp constructed in accordance with the invention, seen in the direction of an arrow B in FIG. 2;

FIG. 2 is a side view of the rope eye in the direction of an arrow A in FIG. 1, at right-angles to FIG. 1;

FIG. 3 is an end view, partly in section, on a line III—III in FIG. 1, on a larger scale, and FIG. 4 is an end view corresponding to FIG. 3 of the opposite end of the rope clamp, on a line IV—IV in FIG. 1.

The rope clamp 1 has a main portion 2 and end portions 3, 4. In the embodiment shown it serves to form an eye 5 from the rope 6. The rope is passed through the clamp blank before the clamp is pressed, and the end of the rope is inserted partway into the blank again as indicated by broken lines.

The blank used for making the rope clamp 1 is a length of flat tubing with an oval cross-section. Such clamp blanks are so generally known that no further description or illustration is required. Since they are simply cut off long continuous-cast tubes and require substantially no further processing, they are relatively inexpensive, certainly much less costly than other known clamp blanks which are drop-forged and also serve to make a rope clamp with a conical end portion.

The material of the rope clamp will probably be an aluminium alloy, as is well known, but other materials may be used if they are sufficiently plastic.

Whereas end portion 4 of the clamp, which faces the free length of rope and surrounds only one piece of rope, has the known conical form which is circular in cross-section (FIG. 4), the opposite end 3 has the novel form in accordance with the invention as will be clear from a comparison of the FIGS. 3 and 4. In the side view (FIG. 2) the tapering of the other end portion 3 is substantially the same as the cone angle of the opposite end portion 4, but in the plane (FIG. 1) which is perpendicular to this plane the tapering is less marked. The end view (FIG. 3), however, shows a substantially tapering oval surface at the free end of the end portion 3. The transition from the circular cross-section of the main portion 2, which is produced as a result of the dies pressing the oval clamp blank around the two pieces of rope, to this tapering oval shape is continuous in all directions. The arrangement is such that the main axis 7 of the substantially oval cross-sectional surface at the exit of the end portion 3 (FIG. 3) runs in the direction of a line joining the centers of the two pieces of rope 6. That the end face 3a of the end portion 3 is oval is also clear from a comparison of the FIGS. 1 and 2, because the cone angle of the portion 3 in FIG. 1 is much less pronounced than the cone angle in FIG. 2.

Before the clamp blank is pressed into the shape according to the invention, the rope 6 is threaded through the blank and the end 8 of the rope is inserted into only one end of blank to terminate short of the other end of the blank. Then the blank with the rope parts therein is placed in the press jaws in a known manner. The length of the blank is such that each end of it projects only partly into the portions of the press jaws shaped like the subsequent end portions 3, 4. During pressing at least one of the tapered end portions 3, 4—more particularly the end portion 3 with the novel shape—is formed mainly because the clamp material flows in the longitudinal direction of the clamp.

What I claimed is:

1. A rope clamp clamping together two rope portions placed in overlapping relationship with each other, said clamp comprising a sleeve having an exterior cylindrical portion from one end of which extends an end portion, said cylindrical portion and said end portion having means defining a passage receiving said two overlapping rope portions, said cylindrical portion having a circular cross-section and said end portion exteriorly tapering from said cylindrical portion to the free end of said end portion having a substantially oval cross-section at its said free end, the main axis of said oval cross-section extending in the direction of an imaginary line passing perpendicularly through the centers of said two overlapping rope portions when positioned in said passage of said clamp, said cylindrical portion and said end portion being of a deformable material which has been deformed into engagement with said rope portions thereby to connect the same.

2. The rope clamp set forth in claim 1, wherein said sleeve further has another end portion extending from the other end of said cylindrical portion, said other end portion having means defining a passage which is aligned with said passage in said first mentioned end portion and said cylindrical portion and has arranged therein a single rope portion, said other end portion tapering from said cylindrical portion has a frusto-conical configuration with a circular cross-section throughout its axial length, said overlapping rope portions which are assembled in clamping relationship in said clamp being portions of a single rope length which is doubled over to form an eye positioned at one end and outside of said first mentioned end portion, said rope length in the form of said single rope portion extending through said other end portion, said other end portion also being of deformable material which is deformed to be in engagement with the entire circumference of said single rope portion.

References Cited
UNITED STATES PATENTS

| | | | |
|---|---|---|---|
| 2,346,412 | 4/1944 | Bratz | 24—129 |
| 2,476,731 | 7/1949 | Hobbs | 287—78 |
| 2,895,195 | 7/1959 | Ehmann | 287—78 |
| 2,936,499 | 5/1960 | Rohland. | |
| 3,087,216 | 4/1963 | Tedesco. | |

FOREIGN PATENTS

| | | |
|---|---|---|
| 879,868 | 10/1961 | Great Britain. |
| 156,974 | 11/1956 | Sweden. |

BERNARD A. GELAK, *Primary Examiner.*

U.S. Cl. X.R.

287—80, 78